March 7, 1967     H. CARY     3,307,410
ACCELEROMETER
Filed Jan. 2, 1963
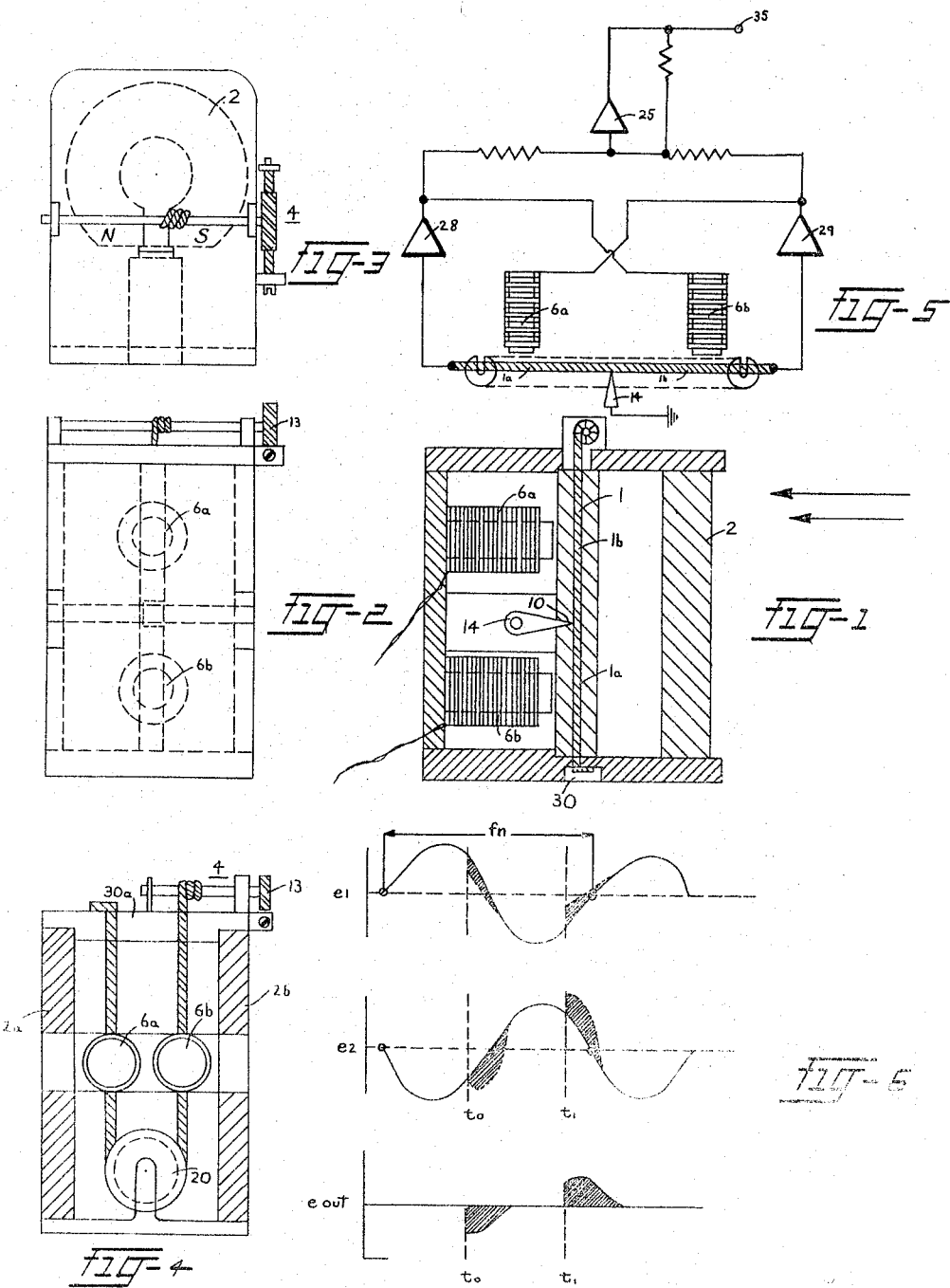
INVENTOR.
HALL CARY
BY

United States Patent Office 3,307,410
Patented Mar. 7, 1967

3,307,410
ACCELEROMETER
Hall Cary, Worthington, Ohio, assignor, by mesne assignments, to The Reliance Electric and Engineering Company, Cleveland, Ohio, a corporation of Ohio
Filed Jan. 2, 1963, Ser. No. 248,965
8 Claims. (Cl. 73—517)

This invention generally relates to accelerometers and particularly to a new and improved high sensitivity accelerometer for the measurement of low level accelerations over a broad range of frequencies, including extremely low frequencies.

Developments in aerospace systems have made stringent demands for accuracy, precision, sensitivity, and ruggedness in environmental sensing devices. Usually, a compromise is made where accuracy is gained at the expense of precision and environmental ruggedness, or sensitivity is sacrificed to meet the temperature or nuclear radiation environments.

The prior art sensing devices employed in the field of environmental measurements and testing are velocity pickups and seismographs (usually a special form of velocity pickup) and accelerometers. Of these two devices, the accelerometer is most universally applicable. The reason for its adaptability is that in electronic circuitry, it is easier to integrate than it is to differentiate. Hence, from an accelerometer there may be had direct readings of acceleration units, velocity, or displacement, while readout of acceleration from a velocity pickup is extremely difficult.

In the field of environmental measurement and control, accelerometers have not been universally acceptable because of certain limitations. Most high output accelerometers capable of measuring low level ambient vibrations employ the use of the piezo-electric phenomena. These pickups have an extremely high impedance at low excitation frequencies. Accordingly, the user is confronted with the problem of poor signal-to-noise ratio when low amplitude vibrations at low frequency must be observed. Also, because of the impedance problem, most accelerometers cannot be placed at remote locations without remotely located preamplifiers. Further, these crystal accelerometers are subject to degradation under extreme environments and are unusable in the presence of high temperature or nuclear radiation.

The basic limitation in low frequency response has proven the velocity pickup as the most valuable sensing device for environmental measurement; and investigators have, for the most part, contented themselves with velocity and displacement information. Velocity transducers do, however, have their limitations. The velocity pickup depends upon a pendular mass supported by a spring system. The device has some resonant frequency (usually between 5 and 10 cycles if the device is of a practical size) and care must be taken to avoid spurious readings in this region. Velocity sensitive devices are also particularly sensitive to low frequency excitations below the natural resonance of the pickup. A steady state or low frequency acceleration of small amplitude may drive a velocity pickup to the maximum limits of its spring system. The "bottoming" of the pendular mass system causes the device to be completely insensitive to higher frequency excitations. This causes low level low frequency ambient acceleration to mask valid information about higher frequency excitations.

This "bottoming" effect has been successfully exploited in certain types of string or ribbon accelerometers employed for inertial guidance applications. In these applications, the primary concern is with D.C. or steady state accelerations. These devices depend upon the resonant frequency of a stretched string which changes as a result of acceleration acting on a mass attached to that string. These devices fulfill the function of measuring steady state accelerations and decelerations, but are insensitive to vibrations or transient accelerations.

The accelerometer of the present invention overcomes the above noted disadvantages and is designed to operate on a new and improved principle not heretofore used in transducers; specifically, a vibrating string is utilized as its principle of operation. The primary advantage gained with this accelerometer over conventional types is the ability to measure low level accelerations over a broad range of frequencies, including D.C. or steady state acceleration. With the unique concept employed, the device would have no natural resonant frequency and because of its low impendance output, noise problems are at a minimum; and is reliably operable despite the environmental conditions.

The sensing transducer of the present invention finds particular utility as a device to sense ambient perturbations surrounding an inertial guidance system during its initial checkout and calibration. The requirements of such a system call for a device capable of sensing extremely low acceleration ($10^{-7}$ g) with high accuracy at very low frequencies (D.C. to 10 c.p.s.). Also, the simplicity of construction of the device may extend its usefulness as an inertial guidance component which could provide extreme sensitivity and accuracy with no sacrifice of environmental ruggedness. The device would, in a preferred embodiment, be virtually insensitive to high temperature ambients. Since all associated active electronic elements can be located at a remote point from the transducer (because of its low impedance), the device should be especially suitable for remote observation of vibration in equipment operating in high level gamma, fast neutron or thermal neutron fluxes.

It is accordingly a primary object of the present invention to provide a new and improved accelerometer.

It is a further object of the present invention to provide a low impedance accelerometer transducer operable to accurately measure extremely low level accelerations, particularly at low frequencies.

It is another object of the invention to provide an accelerometer that inherently has high output at low impedance, thus gaining a favorable signal-to-noise ratio—the desired threshold of the transducer would be $10^{-7}$ g or lower. It is another object of the invention to provide an accelerometer transducer which because of its principles of operation, exhibits no discontinuities in output which are frequency dependent, thus allowing measurements of accelerating forces from steady state to high frequencies (greater than 10,000 c.p.s.) without necessity for using calibration curves for correction.

It is another object of the invention to provide an accelerometer transducer which has unique capabilities to withstand severe environmental conditions and that is insensitive to high thermal stresses and nuclear radiation.

Other objects and features of the present invention will become apparent from the following detailed description when taken in conjunction with the drawings in which:

FIGURE 1 is an electrical and mechanical schematic illustration of a preferred embodiment of the present invention;

FIGURE 2 is an end view of the electrical and mechanical schematic illustration of the preferred embodiment shown in FIGURE 1;

FIGURE 3 is a top view of the electrical and mechanical schematic illustration of the embodiment shown in FIGURE 1;

FIGURE 4 is a cross-sectional view of an alternative embodiment of the accelerometer shown in FIGURE 1;

FIGURE 5 is an electrical circuit diagram of the invention shown in FIGURE 1; and, FIGURE 6 is a series of waveforms intending to illustrate the principle of operation of the invention.

A conceptual drawing depicting the essential structure of the present invention is shown in FIGURES 1, 2, and 3. The accelerometer consists of the principal elements, string 1, knife-edge balance 14, and a circular magnet 2 that comprises the sensing element. The balance 14 is mechanically fixed in position at the midpoint of the string 1 to form a mechanical null point. The string 1 would be a high tensile strength type wire, such as a piano wire, band or ribbon, that can be stretched taut so as to vibrate at a high frequency. In construction of the instrument, one end of the string 1 is fixedly positioned to the lower support 30 of a non-magnetic insulating material, then drawn taut over the tension balancing knife-edge 10 of the support 14 and terminated at its other end with the wind-up reel 4. In this way, two vibrating string sections 1a and 1b are formed.

The reel 4 comprises a roll positioned between two supports. The worm screw 13 increases or decreases the tension on the string 1 and hence is operative to tune the string. It is apparent that other means may be substituted for the windup reel 4. This adjustment is for experimental purposes only, since in a final production version of the pickup, adjustment would not be necessary.

A circular-shaped permanent magnet 2 provides north and south pole pieces 2a and 2b. To provide excitation for the two vibrating string sections 1a and 1b, a magnetic exciter comprising coils 6a and 6b is positioned on opposite sides of the balance 14.

A diagram of the associated circuitry for the vibrating string accelerometer is shown in FIGURE 5. In operation of this circuit the strings 1a and 1b vibrating at their natural resonant frequency cut the flux lines of the permanent magnet 2 providing thereby a velocity dependent sinusoidal signal. The signal from one string segment is fed to its associated amplifier which in turn drives the magnetic exciter coils associated with the other string segment. That is, a signal from string segment 1a is fed to amplifier 28 whose output is used to excite string 1b and signal from string segment 1b is fed to amplifier 29 whose output in turn is used to excite string 1a. In this way, the system forms a self-excited electromechanical multivibrator.

The two amplified signals from the amplifier outputs 28 and 29 are also fed to a discriminator circuit where they are added by means of a summing amplifier 25. The output of the discriminator provides a signal proportional to the acceleration input to the sensing element. The signal at output 35 may be applied to an indicator or other utilization means.

In the theory of operation, it is known that a string stretched between two supports will vibrate at a natural fundamental frequency $f_n$. The fundamental frequency of oscillation, $f_n$, in cycles per second, will be:

$$f_n = \frac{1}{2L}\sqrt{\frac{F}{P}}$$

where L is the length of the wire, F is the tensile force on the wire (in gram cm. sec.$^{-2}$) and $p$ is the weight per unit length of the wire (in grams cm.$^{-1}$). When the wire is excited, by electromagnetic energy such as by coils 6a and 6b at the string's resonant frequency, the displacement at any point on the string as a function of time, will be a conventional sine wave. The axis of vibration (the longitudinal axis of the string in the rest position) will be the electrical equivalent of the zero voltage line of the sinusoidal signal. Further, a linear acceleration imposed on the assembly in a plane parallel to the axis of vibration will disturb the resultant sine wave, that is, the vibration of the two section strings will no longer be a uniform sinusoid.

In the embodiment shown in FIGURE 1, the two string sections 1a and 1b vibrate at their natural fundamental frequency. Since the two string sections 1a and 1b will have the same weight per unit length, length, and tension, the fundamental frequency will be the same. However, the string sections 1a and 1b will be vibrating with a phase displacement of 180° with respect to one another. A velocity signal derived from each of these string sections when added electrically would result in a null output. When a linear acceleration is imposed on the two string sections in a vector plane parallel to the axis of vibration, that is having a wave front in the direction of the arrows of FIGURE 1 the disturbances produced on the two string sections would result in a change in the two velocity signals which, when combined, would be additive.

This phenomenon is described graphically in FIGURE 6 which depicts the velocity output signal from the two wire segments $e_1$ and $e_2$. Electrically added, the output of these two waveforms is zero. However, with a linear acceleration acting on the system at time $t_0$ or $t_1$, the resulting perturbations in the two output waveforms become additive resulting in the function $e_{out}$ as depicted. It should be noted that the signals are polarized relative to the direction of the accelerating force acting on the two wires.

The two string sections 1a and 1b formed from the excited string 1 is not to be limited to the configuration shown in FIGURE 1. With reference to FIGURE 4, an alternative embodiment of the invention is illustrated. In the construction of this instrument one end of the string 1 is fixedly positioned to the upper support 30a of non-magnetic insulating material, the string 1 is looped and drawn taut around the pulley 20. The string is then terminated at its other end with the windup reel 4. In this way the two vibrating strings 1a and 1b are formed.

Although a certain and specific embodiment of the present invention is shown, modifications may be made thereto without departing from the true spirit and scope of the invention.

What is claimed is:

1. An accelerometer comprising a magnetic field, a two-section electrically conductive string, means for stretching said string through said magnetic field, means for each of said sections for passing a current through said string to excite said string to cause said string to vibrate at its resonant frequency and with a phase displacement of 180° of one section with respect to the other section, said sections each cutting the lines of flux of said magnetic field, means to feed the output signal generated by motion of one of said sections to drive the excitation means of the other of said sections and thereby providing a null balance electrical relationship; an acceleration sensing element including said stretching means imposing a disturbance on said string vibration in response to accelerating forces, said vibration causing the electrical signal from each of said sections to have a distorted waveform thereby distributing said null balance electrical relationship, and electrical means connected to the output of each of said excitation means for comparing the output electrical signals of each of said sections for variations in vibration and thereby providing a signal proportional to the acceleration input to said sensing element.

2. An accelerometer comprising a magnetic field, a two-section electrically conductive string, means for stretching said string through said magnetic field, means to excite each section of said string to cause said string to vibrate at its resonant frequency with a phase displacement of 180° of one section with respect to the other section, said vibrating sections cutting the flux lines of said magnetic field and thereby generating a pair of velocity dependent sinusoidal electrical signals, means to feed said signal of one section to drive the excitation means of said other section to provide a null balance electrical relationship, an acceleration sensing element including said stretching means imposing in the presence of an accelerating force a disturbance on said string vibration, said vibration causing the electrical signal from each of said sections to be a distorted sinusoidal signal thereby imposing an electrical change in the balance of said two signals; and means connected to each of said excitation means to detect said change to provide a signal proportional to the acceleration input to said sensing element.

3. An accelerometer as set forth in claim 2 wherein said two section string further comprises means for adjusting the tension of both of said sections.

4. An accelerometer as set forth in claim 2 wherein said string is looped into two sections and positioned to have both sections stretched through said magnetic field.

5. An accelerometer as set forth in claim 2 wherein said string further comprises a mechanical null point.

6. An accelerometer as set forth in claim 2 wherein said means to provide a signal proportional to the acceleration comprises a discriminator to discriminate between said excitation signal and said acceleration signal.

7. An accelerometer as set forth in claim 6 wherein said two sections of said string each have one end connected to said sensing element and its other end connected to said discriminator means.

8. An accelerometer comprising a magnetic field, a two-section electrically conductive string, means for stretching said string through said magnetic field, means to excite each section of said string to cause said string to vibrate at its resonant frequency with a phase displacement of 180° of one section with respect to the other section, said vibrating sections cutting the flux lines of said magnetic field and thereby generating a pair of velocity dependent sinusoidal electrical signals, means to feed said signal of one section to drive the excitation means of said other section to provide a null balance electrical relationship, an acceleration sensing element including said stretching means imposing in the presence of an accelerating force and disturbance on said string vibration, said vibration causing the electrical signal from each of said sections to be a distorted sinusoidal signal thereby imposing an electrical change in the balance of said two signals, a summing amplifier, means connecting the electrical output of said two-section string thereto, said amplifier operative to discriminate between said excitation signal and said acceleration signal to detect said change to provide a difference signal proportional to the acceleration input to said sensing element.

References Cited by the Examiner
UNITED STATES PATENTS

| | | | |
|---|---|---|---|
| 2,604,787 | 7/1952 | Coyne | 73—517 |
| 2,940,306 | 6/1960 | Lozier | 73—71.2 |
| 2,968,943 | 1/1961 | Statham | 73—517 |
| 2,968,950 | 1/1961 | Dunbar | 73—517 |
| 3,057,208 | 10/1962 | Bedford | 73—517 |

RICHARD C. QUEISSER, *Primary Examiner.*

J. J. GILL, *Assistant Examiner.*